United States Patent
Walton et al.

[11] 3,795,997
[45] Mar. 12, 1974

[54] NON-ROTATING WHEEL COVER MEMBER

[75] Inventors: Philip M. Walton; Walter J. Berg, both of Honolulu, Hawaii

[73] Assignee: Unitron Corporation, Honolulu, Hawaii

[22] Filed: Apr. 23, 1973

[21] Appl. No.: 353,751

[52] U.S. Cl. .............................................. 40/129 B
[51] Int. Cl. ............................................... G09f 7/00
[58] Field of Search .............. 40/129, 129 B, 129 C; 301/37 R

[56] References Cited
UNITED STATES PATENTS

| | | | |
|---|---|---|---|
| 897,615 | 9/1908 | Geserich | 40/129 B |
| 2,548,070 | 4/1951 | Ryan | 40/129 B |
| 3,381,400 | 5/1968 | Beaudoin | 40/129 B |
| 3,457,663 | 7/1969 | Beaudoin | 40/129 B |
| 3,495,347 | 2/1970 | Sims | 40/129 B |

Primary Examiner—Harland S. Skogquist
Assistant Examiner—Wenceslao J. Contreras
Attorney, Agent, or Firm—Revere B. Gurley

[57] ABSTRACT

A non-rotatable wheel cover member is mounted on a plate carried by a fixed axle, the plate being mounted on a lock nut on the axle in a fixed position and has notches at top and bottom in which a lug and latch on the cover member engage to mount the cover member in upright position. The cover member may carry advertising matter on its outer side.

8 Claims, 9 Drawing Figures

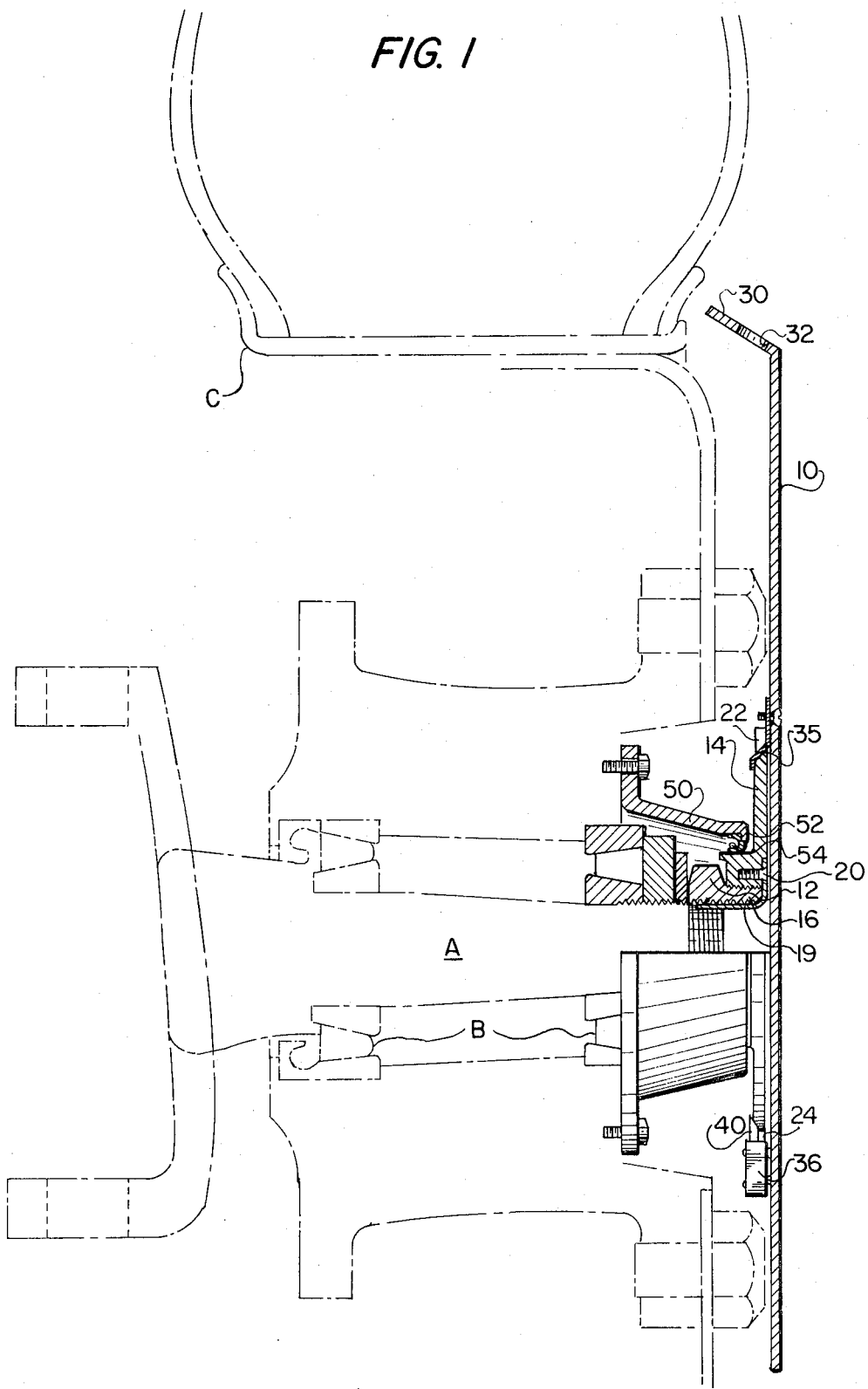

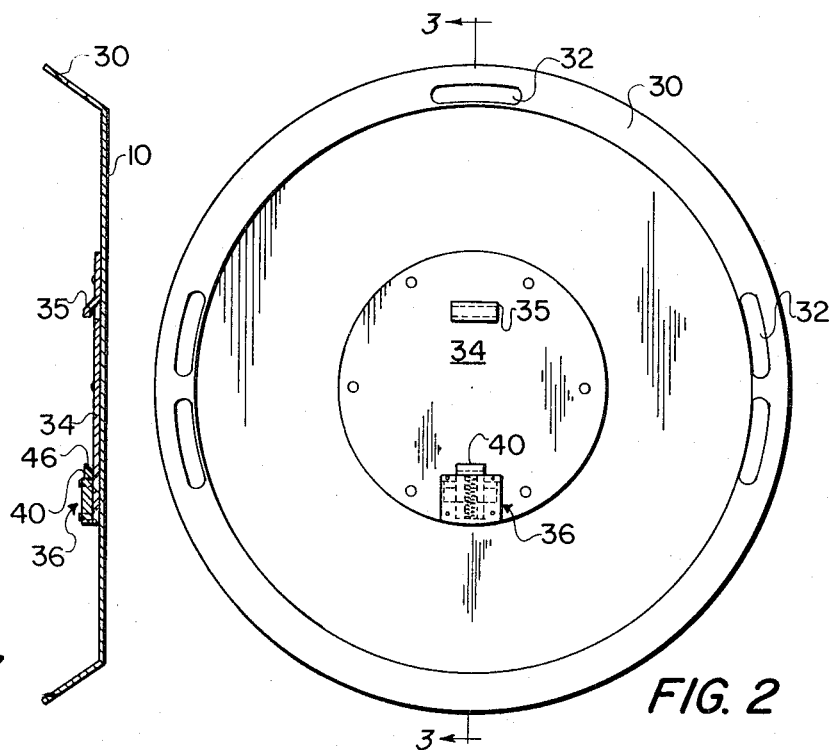
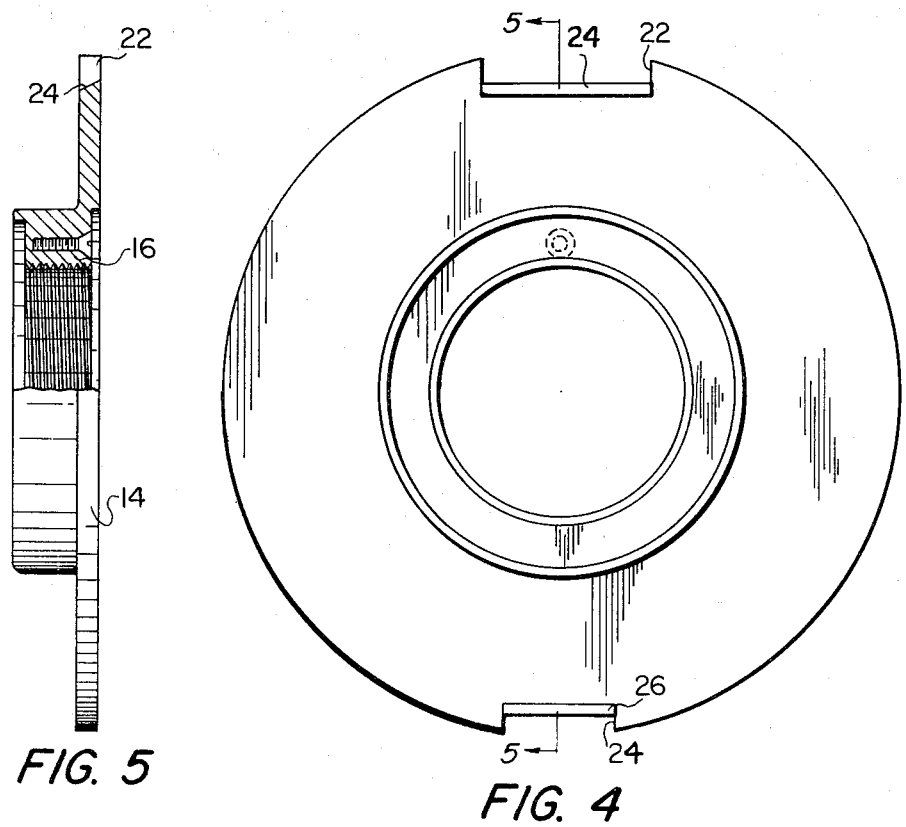

PATENTED MAR 12 1974 3,795,997
SHEET 3 OF 3
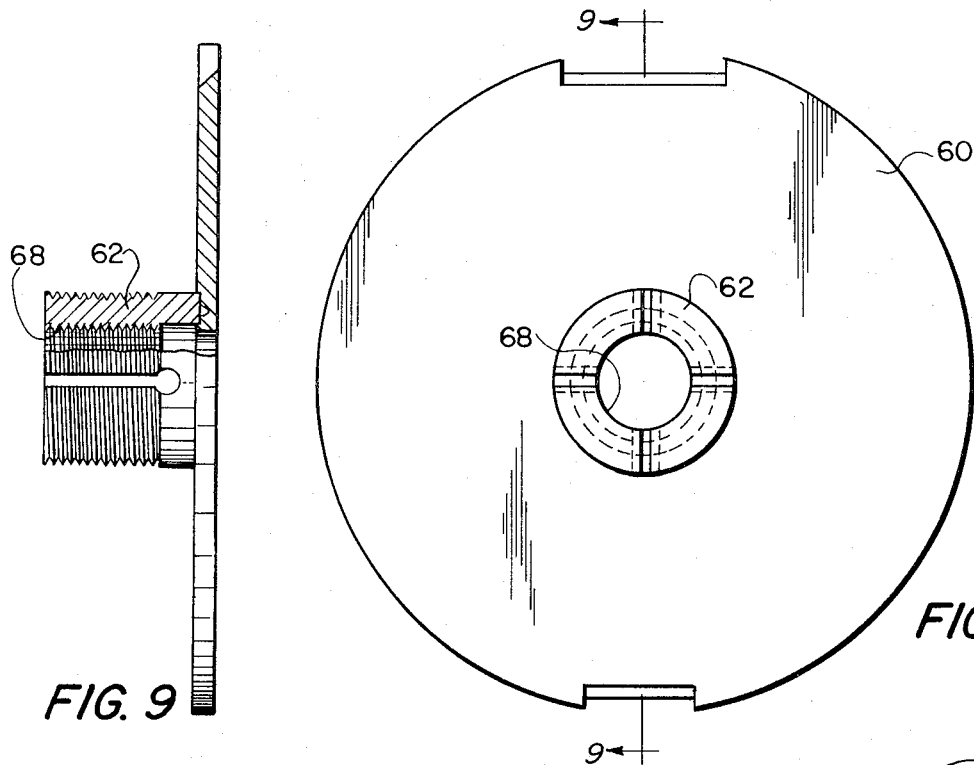
FIG. 9
FIG. 8
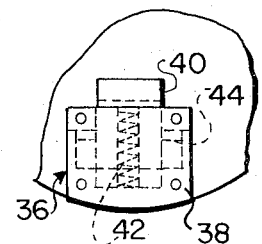
FIG. 6
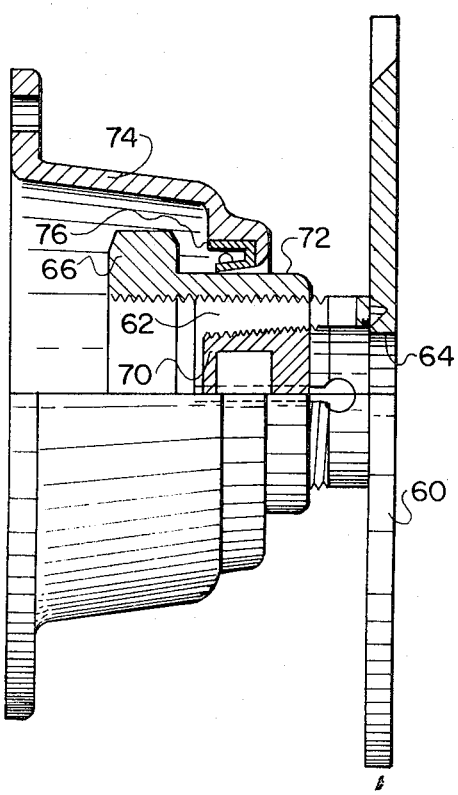
FIG. 7

3,795,997

NON-ROTATING WHEEL COVER MEMBER

This invention relates to a non-rotating member, such as a disk cover member, which is mounted on a vehicle and is used for carrying advertising.

NATURE AND OBJECT OF INVENTION

The object of this invention is to mount a wheel cover member on a fixed axle, such as the spindle of a front wheel assembly, so that the cover member is always in upright position, is easily removable, and may be adjusted inwardly or outwardly of the wheel. A mounting plate is carried on a nut threaded on the axle, the plate being threaded on the nut for adjustment toward or away from the wheel and secured against rotation. The mounting means on the cover member are formed to secure the cover member on the mounting plate in upright position, a lower locking element on the cover being spring biased to engage the lower edge of the plate and while the cover member is raised against the spring bias, to engage a top hook element over the top edge of the plate. The cover is formed to allow free circulation of air about the wheel and axle assembly.

DRAWINGS

In the drawings:

FIG. 1 is a view partially in vertical section and partly in elevation of a cover member mounted on the wheel spindle.

FIG. 2 is an elevation of the inner side of the cover member.

FIG. 3 is a cross section on line 3—3 of FIG. 2.

FIG. 4 is an elevation of the inner side of the mounting plate.

FIG. 5 is a cross section on line 5—5 of FIG. 4.

FIG. 6 is an elevation of the lower latch element on the cover member.

FIG. 7 is a view partly in vertical section and partly in elevation of a modified form of mounting plate.

FIG. 8 is an elevation of the inner side of the modified mounting plate of FIG. 7.

FIG. 9 is a cross section on line 9—9 of FIG. 8.

GENERAL DESCRIPTION

The wheel cover member 10 of this invention is carried by a spindle on fixed axle A having bearings B on which rotates a wheel C. The cover member 10 is stationary on the fixed axle and may cover or partially cover the wheel out to the rim and tire, and may carry advertising matter on its outer side.

The mounting assembly for the cover member 10 comprises a lock nut 12 which replaces the known lock nut and engages the adjusting nut for the bearing. A mounting plate 14 having a central cylindrical portion 16 is threaded on the lock nut, so that the mounting plate may be adjusted axially within the limits of the threaded engagement. A lock member 19 of L-shape has one leg seated in a recess 18 on the outer side of the plate 14 and held by screw 20, while the other leg extends into the lock nut 12, engaging the usual flat surface provided on the axle, to lock both members against rotation.

The mounting plate 14, shown in detail in FIGS. 4 and 5, has a notch 22 in the upper side of its periphery, the lower edge of the notch being inclined downwardly at 24 on the inner side of the plate. A corresponding notch 26 is formed on the lower side of the periphery, with the upwardly inclined surface 28 on the inner side.

The cover member 10 for mounting on the plate 14 is shown as a disk having a conical peripheral portion 30 with openings 32 in the sides and at the top to provide for circulation of air. A heavier plate 34 is secured to the disk on its inner side for connection to the mounting plate 14. A lug 35 struck out from the upper portion of plate 34 forms a downwardly projecting hook-like element for engagement over the edge of notch 22 in mounting plate 14.

At the lower side of the plate 34, a vertically movable latch member 36 is carried for engagement in the lower notch 26 in mounting plate 14. This latch member 36, shown in detail in FIG. 6 consists of a casing 38 secured to plate 34, in which slides the latch 40, spring pressed upwardly by spring 42. Lugs 44 on latch 40 retain the latch in the casing 38. The outer side of the upper edge of latch 40 is beviled as at 46 to engage the complementary beveled surface 28 on mounting plate 14.

The wheel carries a conical sleeve or closure 50 having a flanged end 52 extending over the periphery of cylindrical portion 16 of mounting plate 14. A seal 54 carried by this flanged end 52 engages the cylindrical portion 16 to seal the rotating wheel hub and loss of grease or ingress of dirt.

OPERATION

The lock nut 12 replaces the standard lock nut and is tightened sufficiently to retain the adjusting nut. The sleeve 50 with the seal 54 replaces the standard hub cover member. The plate member 14 is threaded on lock nut 12 allowing the clearance necessary for the cover member 10, and the lock member 19 is inserted and secured by screw 20. The cover member 10 is then applied to plate member 14 by passing the latch 40 through notch 26 in the lower side of the mounting plate and raising the cover member upwardly to compress latch spring 42, allowing the lug 35 to engage over the edge of notch 22. The beveled edges of the two notches, under the spring pressure on latch 40, act to hold the cover member 10 and plate 34 firmly against the mounting plate 14.

In this manner, the cover member 10 is always carried in upright position, so that advertising on its surface will be properly oriented. The weight of the cover acts to assist the spring 42 to retain it in engagement with the mounting plate and allows it to quickly be removed by raising it to depress the latch and disengaging the upper lug 36.

MODIFIED MOUNTING

In some installations, a modified form of assembly for the mounting plate has been found desirable. As shown in FIGS. 7 and 8, the mounting plate 60, on which is mounted the cover member 10, has a split sleeve 62 secured on its inner side about the central opening 64. The lock nut 66 threaded on the axle extends outwardly sufficiently for the sleeve 62 to thread into the nut 66. The sleeve is also threaded internally with a tapered thread at 68 and a tapered threaded plug 70 is threaded into the sleeve to expand the sleeve and lock the sleeve against rotation.

The lock nut 66 is formed with a cylindrical outer surface 72, and the sleeve 74 on the wheel extends over the nut and carries the seal 76, which engages cylindrical surface 72 to seal the hub.

The lock nut replaces the standard lock nut and may have provision to prevent rotation on the axle. The mounting plate 60 is then threaded on the lock nut 66 the proper distance and the plug 70 is inserted and tightened by a wrench through the central opening in plate 60. The cover member is applied to mounting plate 60 in the same manner as on plate 14.

The wheel cover member is especially adapted to carrying advertising matter and may be easily applied and removed for the substitution of other cover members with new advertising material.

What is claimed is:

1. In a vehicle assembly having a wheel rotatable on a fixed axle, a wheel cover member, and means for mounting said wheel cover member on the end of said fixed axle, said means comprising a nut threaded on the end of said axle, a plate having a cylindrical inwardly projecting member mounted on said nut against rotation, a sleeve member secured to the vehicle wheel with its outer end surrounding said cylindrical member, a seal between said sleeve member and said cylindrical member, means on the wheel cover member for mounting on said plate including a downwardly projecting element engaging over the top edge of said plate and a spring biased latch engageable with the lower edge of said plate, said mounting means securing said wheel cover member against rotation on said plate.

2. In a vehicle assembly as claimed in claim 1, in which said wheel cover member has a conical periphery adjacent the rim of the wheel, and said conical periphery has openings to provide for circulation of air.

3. In a vehicle assembly as claimed in claim 1, in which said latch engages in a notch on the lower side of the edge of said plate, the edge of said notch having a rearwardly facing inclined surface and said latch having a forwardly facing inclined surface, so that said cover member may be raised up against the spring biased latch to engage the downwardly projecting element over the upper edge of said plate, the inclined surfaces on said latch member and plate engaged under spring pressure to hold said cover member against said plate.

4. In a vehicle assembly having a wheel rotatable on a fixed axle, a non-rotatable wheel cover member, and means mounting said cover member on the end of said fixed axle, said means comprising a lock nut threaded on the end of said axle, a plate perpendicular to the axis of said axle supported on said lock nut, said nut and said plate being fixed against rotation on said axle, interengaging means on said cover member and plate to secure said cover member non-rotatably on said plate in upright position, said means including upper and lower elements on the inner side of said cover member diametrically opposite each other across the central axis of said cover member, said upper element having a downwardly extending, outwardly facing shoulder to engage behind an edge at the top of said plate on movement downwardly, and said lower element comprising an upwardly spring-biased, vertically movable latch having an outwardly facing surface engaging behind an edge at the bottom of said plate, said latch being depressible against its spring bias upon movement of said cover member upwardly when said latch engages the edge at the bottom of said plate, so that said cover member may be mounted on said plate by engaging said latch with said edge at the bottom of said plate and raising said cover member to depress said latch, and engaging said shoulder with the edge at the top of said plate as said cover member moves downwardly under the spring bias of said latch.

5. In a vehicle assembly as claimed in claim 4, in which the shoulder on said upper element has an outwardly and downwardly facing inclined surface and the plate has a complementary rearwardly facing inclined surface at said edge at the top of said plate, and the surface on said latch is an outwardly and upwardly facing surface, and the plate has a complementary rearwardly facing surface at said edge at the bottom of said plate.

6. In a vehicle assembly as claimed in claim 5, in which each of said edges at the top and bottom of said plate is formed as the edge of a notch in the periphery of said plate, so that said elements on said cover member engage in said notches to position said cover member in upright position and prevent relative rotation.

7. In a vehicle assembly as claimed in claim 4 in which said cylindrical inwardly projecting member is split to form a split sleeve and is threaded into the lock nut, and a sleeve carried by the vehicle hub has a sealing member surrounding and engaging said lock nut to seal the wheel bearings.

8. In a vehicle assembly as claimed in claim 4, in which said split sleeve is threaded internally and a tapered plug threaded into said split sleeve to expand it into locking engagement with said nut.

* * * * *